United States Patent [19]

Hansen et al.

[11] 4,436,958

[45] Mar. 13, 1984

[54] SYSTEM USING THE TELEPHONE NETWORK TO CONTROL LOCKS AT A NUMBER OF REMOTE LOCATIONS

[75] Inventors: Robert C. Hansen, Orland Park; Paul G. Novorolsky, Carol Stream, both of Ill.

[73] Assignee: Western Electric Company, Inc., New York, N.Y.

[21] Appl. No.: 393,992

[22] Filed: Jun. 30, 1982

[51] Int. Cl.³ ............................................. H04M 11/00
[52] U.S. Cl. ..................................................... 179/2 A
[58] Field of Search .................. 179/2 A, 2 AM, 5 R, 179/5 P, 18 B, 18 BA, 18 BD, 18 BE, 84 VF, 90 B, 90 BD, 90 K, 37-39

[56] References Cited

U.S. PATENT DOCUMENTS

| | | | |
|---|---|---|---|
| 3,484,561 | 12/1969 | Matthews | 179/39 |
| 3,557,318 | 1/1971 | Buonsante et al. | 179/39 |
| 3,917,911 | 11/1975 | Lesher | 179/37 |
| 3,947,641 | 3/1976 | Trell | 179/2 A |
| 4,113,986 | 9/1978 | Clement et al. | 179/2 A |

FOREIGN PATENT DOCUMENTS 2033319 1/1972 Fed. Rep. of Germany ..... 179/2 A
2,141,126 2/1973 Fed. Rep. of Germany ..... 179/2 A

*Primary Examiner*—G. Z. Rubinson
*Assistant Examiner*—W. J. Brady
*Attorney, Agent, or Firm*—R. P. Miller

[57] ABSTRACT

A number of remotely located locked devices (26 and 27) are selectively operated by sending signals from a central supervisory location (28) through the telephone network (27) to a telephone set 32 and a converter (44) installed at each remote location. Initiating call signals from a remote telephone set are automatically generated and routed through the telephone network to a supervisory telephone set equipped with a standard 0-9 digit dial plus a special pushbutton (34) for generating a special signal. Receipt of the special signal at a calling remote station disconnects the remote telephone set and conditions a stepping circuit (74-86) and a sequence circuit (81-82) for subsequent operation upon receipt (88-104) of a predetermined sequence of 0-9 digit signals. Upon receipt of the predetermined sequence of signals within a first set time period, the stepping circuits and the sequence circuits are operated to generate (111) a signal that releases the locked device for a second set time period.

16 Claims, 4 Drawing Figures

SYSTEM USING THE TELEPHONE NETWORK TO CONTROL LOCKS AT A NUMBER OF REMOTE LOCATIONS

FIELD OF THE INVENTION

This invention relates to a system for selectively controlling a number of locked facilities at a number of diverse remote locations and, more particularly, to a system utilizing a commercial telephone network for the transmission of lock control signals between a central controller telephone set and telephone sets at the remote locations.

BACKGROUND OF THE INVENTION

Over the years a number of systems have been developed and installed for selectively controlling the entry into a locked building, e.g., apartment houses, through the use of telephones located in a number of rooms along with an auxiliary control and switching units for communicating with individuals seeking entry and for controlling the release of the lock.

Several of these systems, such as disclosed in U.S. Pat. No. 3,917,911 issued Nov. 4, 1975 to J. M. Lesher, U.S. Pat. No. 3,947,641 issued Mar. 30, 1976 to A. E. Trell and U.S. Pat. No. 4,113,986 issued Sept. 12, 1978 to G. F. Clement et al., use commercial telephone central offices to establish selective communication and control paths between tenants and a visitor seeking entry through a single locked door.

Other systems have been developed for selectively controlling access through a number of locked gates. One such system known as the Affirm Facility Management Systems manufactured by the Western Electric Company, Incorporated, New York, N.Y., utilizes an on-line card to limit entry by person, building, time of day and day of week. To gain admission, an encoded identification cards is inserted in a card reader at a particular one of a number of entrances to a building. The reader scans the card and transmits the data to a local control unit which determines whether the card holder should be admitted through that entrance, at that time and on that day. The data base for these control functions stores several thousands admittance data and can be readily updated.

There is still a need for a rather simple security system for selectively releasing locked devices for facilities at a number of remote locations under the control of an operator stationed at a central office. In a system of this type, the controller operator executes the necessary control functions through the agency of a conventional telephone network. In such a system the control should be attained by pushbutton dialing a sequence of multifrequency call number signals which are utilized to effectuate the selective release of the locked facility to which a person is seeking entry. This system should also include the capability of limiting the time that the locked device is released so that the person must enter the facility during this time, otherwise the controls revert to an original condition. In addition, such a system should also place a limit on the time available for the controller to dial the distinct number sequence indicative of a particular location to which the person is seeking entry.

SUMMARY OF THE INVENTION

This invention contemplates, among other things, a system for selectively releasing lock devices at a plurality of remote locations through multifrequency signals transmitted through a telephone central office which are generated by a controller at a central telephone set. The controller operates the telephone set pushbutton dial to generate a special signal which conditions sequence circuits at the remote locations so that subsequent dial multifrequency signals actuate one of the sequence circuits to release the lock device at one particular remote location.

More particularly, a person seeking entry to a locked facility at a remote location picks up a telephone set receiver to initiate the operation of an automatic multifrequency dialer which sends the call number of controller's telephone set through a commercial telephone office to establish a communication path between the entry-seeking person and the conroller. The person identifies himself to the controller who thereupon initiates the dialing of three multifrequency signals to release the lock device at the remote location for a predetermined period of time during which the person must enter the facility and after which the lock device is restored to an initial locking condition. The first multifrequency signal is converted to a binary coded digital signal to actuate a timing circuit which performs a number of functions, one of which is the setting of a time period in which the controller must pushbutton dial the next two signals indicative of the particular remote location.

At each remote location there is provided a multi-frequency signal converter which acts to convert each received signal to a binary coded signal. The first binary coded digital signal operates the timing circuit which performs an additional function of conditioning a stepping circuit and a sequence circuit. The two-step circuit is operated upon receipt of subsequent multi-frequency signals to operate the sequence circuit which is conditioned in accordance with the receipt of the proper two number sequence of dial signals. The correct operation of the sequence circuit operates a second timing circuit to release the lock device at the remote location. It may be appreciated that the first timing circuit only conditions the other circuits for a predetermined short period of time during which the controller at the central office dials the correct two number dial sequence in order to release the lock device at the remote location. The second timing circuit controls the period in which the lock device is released, during which time the person seeking entry may access the locked facility.

DESCRIPTION OF THE DRAWINGS

Other advantages and features of the invention will be apparent upon consideration of the following detailed description when considered in conjunction with the drawings, wherein.

DETAILED DESCRIPTION

The terms dial and dialing as used in the specification refer or relate to the depression of pushbutton or other call signals generating means associated with a telephone station set to generate multifrequency signals or dial pulses comprised of various combinations of several fundamental frequencies, e.g., the standard commercial code combination of two or four low frequencies and/or three higher frequencies.

Figure 1:
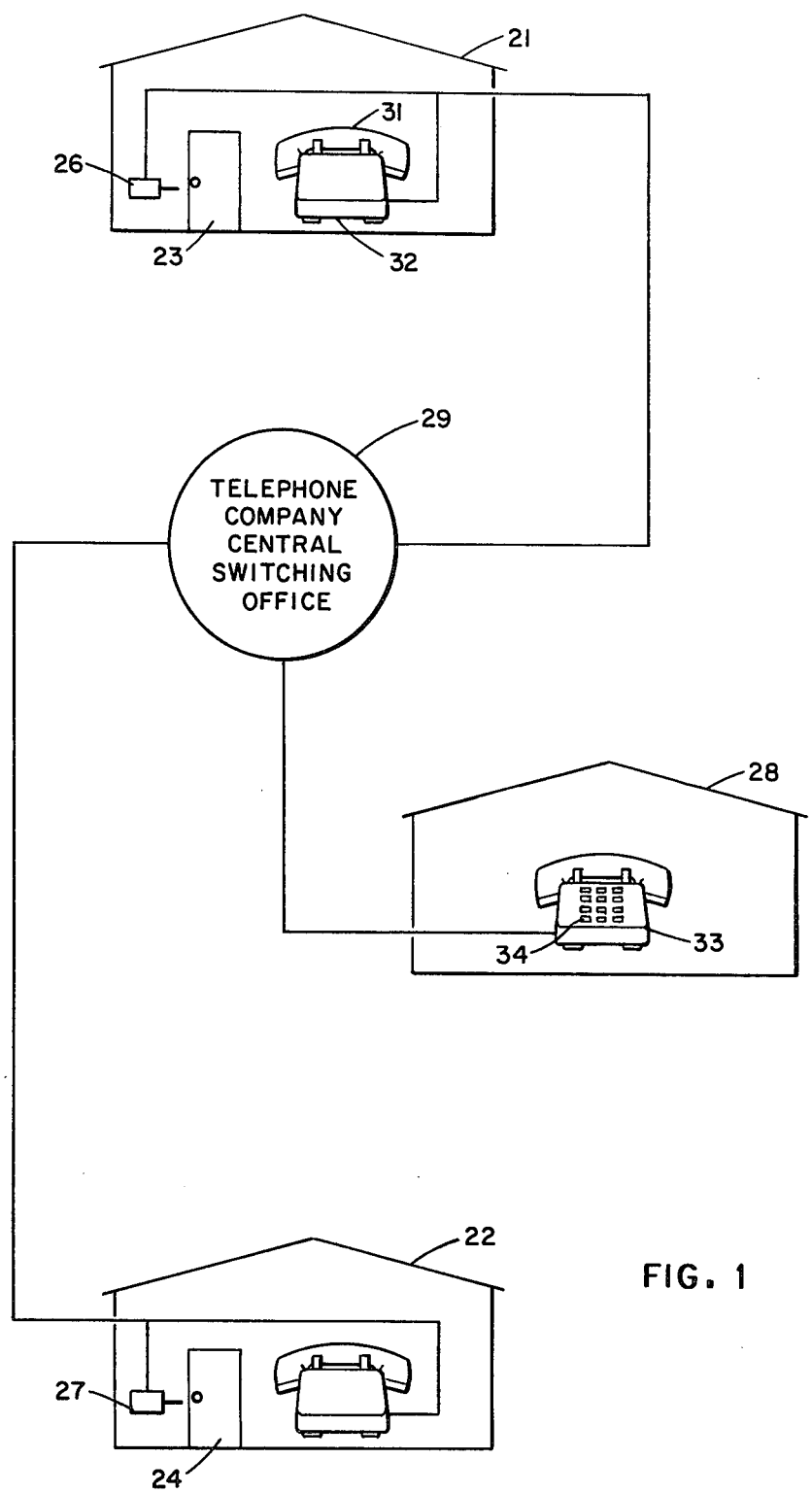
FIG. 1 is a schematic pictorial representation showing, in general, the relationship of a number of secured locations to which entry may be controlled from a common control station which transmits control signals through a commercial telephone central office.

Referring to FIG. 1, there is pictorially illustrated a pair of remote secured buildings 21 and 22 having access doors 23 and 24 which are respectively maintained in a locked condition by solenoid controlled locking devices 26 and 27. The selective release of the locking devices is under the control of a security guard or controller located at a common control building or station 28. The communication and control channels for the locking devices 26 and 27 are established through the use of the standard commercial switched telephone network, a telephone company central office of which is represented by the reference numeral 29.

In general, a person seeking access to one of the secured buildings picks up a receiver 31 of a conventional repertoire dialer telephone set 32. The automatic dialing unit of the telephone set is effective to generate a standard multifrequency series of seven or more dial pulses indicative of the call number of a controller's telephone set 33 located in the building 28. It will be noted that the telephone sets at the remote secured locations need not have pushbuttons or other manually operated dials. Further, it is contemplated that each automatic dialing equipment is secured within the associated locked building. Upon ringing of the controller's telephone set 33, the controller picks up the receiver and orally verifies the identity of the caller seeking access to the secured building. Upon recognition of the authority of the caller to access the building, the controller presses a special or asterisk button 34 to generate a first multifrequency tone dial signal which is impressed through the central office to condition control circuitry at all of the locked facilities. Next, the controller depresses two number pushbuttons indicative of one of the remote secured buildings which signals are routed through the central office to operate the conditioned control circuitry to release the locking device for a limited period of time. If the caller does not open the locked entry door in the limited time period, the lock device is again locked and the entry procedure must be repeated to gain access to the secured building.

Figures 2, 3:
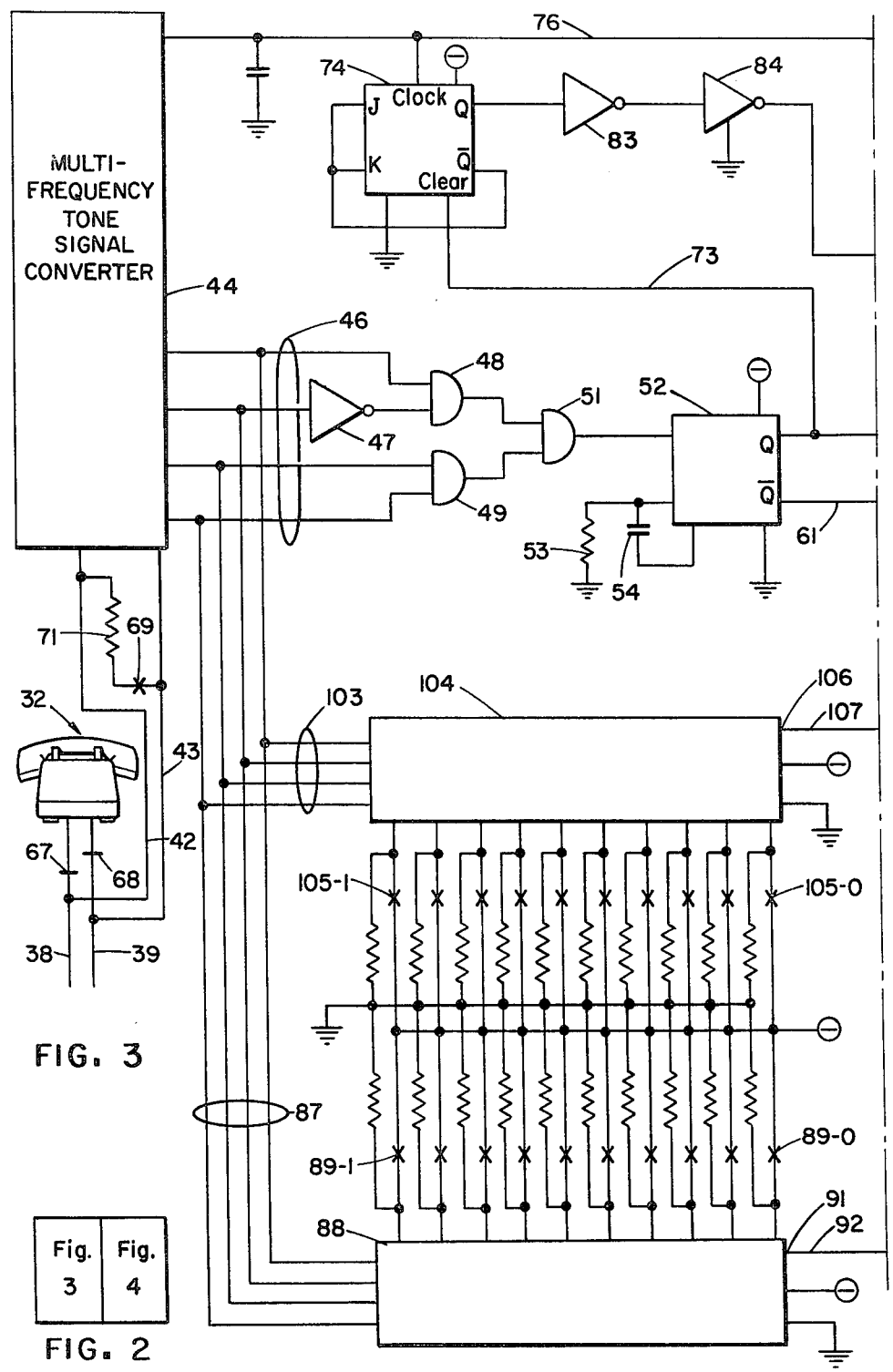
FIG. 2 depicts the manner of assembling the schematic circuit diagrams shown in FIGS. 3 and 4 to portray a system by which a controller may selectively control access to a number of remotely located locked premises in accordance with the principles of the present invention.
Figure 4:
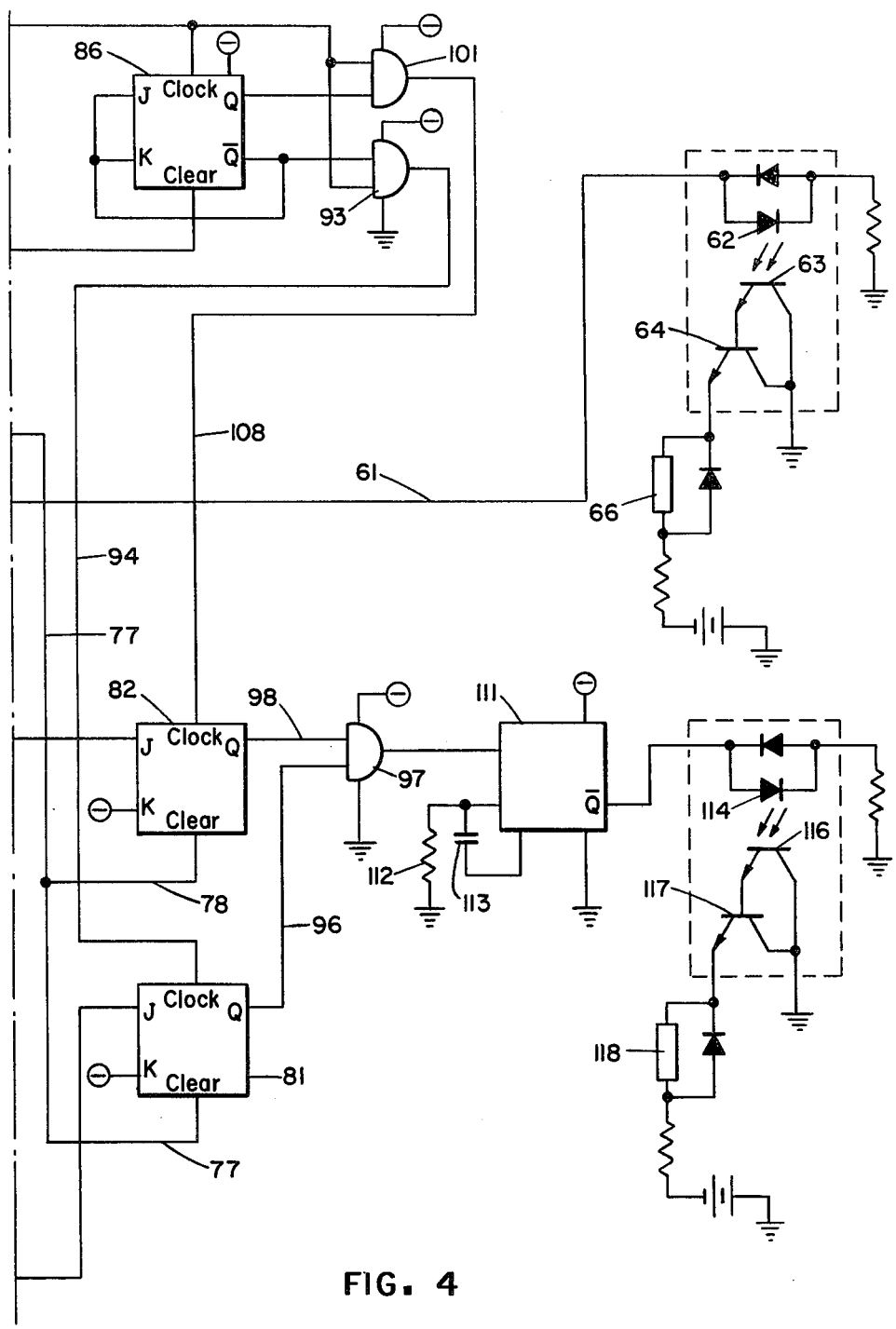

The controls for one of the lock devices are shown in FIGS. 3 and 4 where one telephone set 32 is depicted as being connected through tip and ring wires 38 and 39 to the telephone central office 29. The person seeking entry to the locked facility lifts the receiver of the set 32 and establishes the communication channel to the controller, and upon verification of the identity of the caller, the controller depresses an asterisk button on the telephone set 33 to generate a two frequency tone signal that is impressed through the central office and over the tip and ring wires to a pair of bypass wires 42 and 43. The asterisk multifrequency signal is impressed on a decoder 44 which is of standard manufacture and is adapted to convert two frequency telephone tone signals into binary coded digital signals which appear as binary logic 1 or 0 conditions on a group of four output wires 46. The standard binary coded representation for asterisk signal is 1011. The logic 0 condition is inverted by inverter 47 to logic 1 and is impressed along with the other three logic 1 conditions to a pair of gates 48 and 49 which react to apply two logic 1 pulses to a gate 51. Gate 51 produces a logic 1 output that is applied to a one-shot multivibrator 52 having a period of operation set by a resistor 53-capacitor 54 network. During the period of operation of the multivibrator 52 which is set to time out within a predetermined time, e.g., five seconds, the controller must transmit the necessary succession of two call numbers peculiar to the locking device 26 at the calling location 21.

A $\overline{Q}$ output of the multivibrator 52 goes from a normal reset logic 1 to a logic 0 so as to impress negative potential over a lead 61 to operate a light emitting diode 62 which, in turn, operates a phototransistor 63. Operation of this transistor 63 is accompanied by simultaneous operation of transistor 64 to control the application of energizing current to a relay 66. Energized relay 66 opens a pair of contacts 67 and 68 connected in the tip and ring lines 38 and 39 to disconnect the telephone 32 from the communication circuit. This action serves to preclude the entry seeking person from hearing or detecting any subsequent coded signals which are utilized to release the locking device 26. The operation of relay 66 is also effective to close a contact 69 which functions to connect a resistor 71 across the bypassed tip and ring wires 42 and 43 and, thus in effect, places an impedance across these lines approximating the impedance of the disconnected telephone 32.

When one-shot multivibrator 52 operates, a Q output thereof goes from logic 0 to logic 1 which is impressed on a line 73 running to a clear input of a negative-edge-triggered J-K flip-flop 74 forming a first stage of a two stage stepping circuit to enable this flip-flop for subsequent operation in response to a negative going or trailing edge of a clock pulse impressed on a ready line 76. Each time a multifrequency signal is applied to and transformed to a binary coded digital signal by the converter 44, the converter recognizes the presence of the impressed signal and generates a positive going logic 1 ready pulse which is impressed on the line 76. This ready pulse is maintained on the line for the period that the controller depresses a dial pushbutton on the telephone set 33.

The logic 1 output Q from the one-shot multivibrator 52 is also impressed over line 77 and 78 to the clear or reset ports of a pair of negative-edge-triggered master slave J-K flip-flops 81 and 82 forming two stages of a sequence circuit to enable these devices to respond to sequential inputs applied to the respective J ports. These sequence flip-flops 81 and 82 are initially biased to a reset condition so that the Q outputs are at logic 0. The flip-flops 81 and 82 are subsequently operated in sequence in response to the proper receipt of the two call number sequence dialed by the controller which is the call number indicative of the building 21.

Upon termination of the asterisk signal, the logic 1 condition on line 76 goes to logic 0, and this transition is effective to trip the flip-flop 74 to drive the Q output thereof to logic 1. This logic 1 condition is impressed through and delayed by a pair of tandem connected inverters 83 and 84 to produce a delayed logic 1 condition that is impressed on a clear input of a negative-edge-triggered J-K flip-flop 86 forming the second stage of the stepping circuit. Flip-flop 86 is initially set with a normal Q output at logic 0 and a complementary $\overline{Q}$ output at logic 1. The receipt of the logic 1 at the clear input of flip-flop 82 enable the flip-flop to respond to the negative transition of the next logic 1 pulse on the line 76. This next pulse transition occurs upon conclusion of the dialing of the first number of the two number sequence needed to release the locking device 26.

The receipt of the first number signal of the required two number lock leasing sequence in the converter 44 results in the impression of binary coded digital signals on the leads 46 that are impressed on leads 87 running to multiplexer 88 of the conventional type. The multiplexer 88 is associated with a series of ten switches 89-1-0 which may be selectively closed to respond to a particular binary coded signal input to produce an output at a selected, designated output port 91. Assume that the first of the two number sequence is the number 2, then the closure of the switch 89-2 will result in a change in the logic state of the output 91. Initially output 91 is set at logic 0 so that the selection of the output 91 causes the logic output to go to logic 1. The logic output is impressed on line 92 to the J input of the conditioned flip-flop 81.

At the time during the receipt of the first number, e.g., 2, the flip-flop 86 is in a reset condition and the $\overline{Q}$ output is at logic 1 which is impressed as an enabling condition to a first input of an AND gate 93. During the presence of the first dial number, there is a logic 1 condition impressed on the ready line 76 so that a logic 1 condition appears on the second input to the enabled AND gate 93. The output of gate 93 is, thus, at logic 1 and, a logic 1 condition is impressed over line 94 running to the clock input of the flip-flop 81. At the termination of the ready pulse on line 76, the gate 93 is cut off so that the negative going transition of the pulse acts as a transfer signal and is effectively impressed from gate 93 to toggle flip-flop 81 thereby transferring the logic 1 condition of the J input to the Q output. The flip-flop 81 acts as a latching device and will stay in this latched state until there is a transition of a logic 1 to a logic 0 condition impressed on the clear input. This resetting transition will not occur until the one-shot multivibrator 52 times out and resets which occurs at the expiration of the normal time period afforded the controller to dial the two number sequence needed to open the lock device 26.

The logic 1 ouput of flip-flop 81 impressed over a line 96 to a first input of an AND gate 97 having a second input connected through line 98 to the Q output of the second sequence flip-flop 82. The flip-flop 82 only operates in response to the proper receipt of the second number of the two number sequence for the building 21. In response to the release of the dial pushbutton on the controller telephone set 33, the ready pulse on line 76 goes from logic 1 to logic 0 and thus the negative-edge-triggered flip-flop 86 changes states and the Q output goes to logic 1. This change is impressed as a logic 1 on an "AND" gate 101 to enable this gate for subsequent operation upon application the next logic 1 pulse on the ready line 76.

The receipt of the next or second number multifrequency signal of the two number sequence in the converter 44 results in the application of a binary coded signal being impressed over leads 46, 87 and a set of leads 103 running to a second multiplexer 104 having a response setting group of contacts 105-1 to 105-0. A contact 105-1 to 105-0 is selected so that the multiplexer responds to the second designated number of the dial sequence to produce a change in the state at an output 106. Assume that the second number of the required sequence is the number 4 then the contact 105-4 is closed so that there is a change in the state of the output 106 upon receipt of this second number. Output 106 is normally at logic 0 but upon selection goes to logic 1 to impress a logic 1 condition over a line 107 running to the J input of the now enabled flip-flop 82.

When the second number signal is converted, there is a third logic 1 pulse placed on the ready line 76. Upon termination of the dial pulse indicative of the second number, the logic condition on ready line 76 goes from logic 1 to logic 0. There is a consequent change in the logic output of the now operated AND gate 101. This transition from logic 1 to logic 0 is impressed as a transfer signal over a line 108 to the clock input of a flip-flop 82 which responds by toggling and transferring the logic 1 J input to the Q output. The appearance of logic 1 on the Q output of flip-flop 82 causes a logic 1 condition to be impressed on the line 98 to operate gate 97 that functions to impress a logic 1 condition on a one-shot multivibrator 111. The period of operation of multivibrator 111 is set by a resistance 112-capacitance 113 network and values are selected for these elements to hold the multivibrator in a flipped state for a sufficient period of time to permit the person at building 21 to enter the locked door.

When the one-shot multivibrator 111 is tripped to a set state, its $\overline{Q}$ output goes from logic 1 to logic 0 thereby permitting current to flow through a light emitting diode 114. Light from the diode 114 operates a phototransistor 116 and simultaneously therewith a transistor 117 is operated to supply energizing current to a relay 118. Operation of this relay controls the application of current to the solenoid operated locking device 26. The locking device 26 is now released for a period of time as determined by the selection of the components controlling the period of operation of the one-shot multivibrator 111. If the person does not enter within the period of operation of the multivibrator 111, the multivibrator reverts to the initial setting and the diode 114 is de-energized to release 36 the relay 118 and, thus, the locking device is reactivated.

What is claimed is:

1. A system for selectively operating a device in response to a sequence of telephone call multifrequency dial pulses, which comprises:
    means responsive to each multifrequency dial pulse for generating a transfer signal;
    a sequence circuit responsive to second and third telephone call multifrequency dial pulses and a termination of each accompanying transfer signal for producing output signals;
    a first timing circuit operated by a first of said sequence telephone multifrequency call dial pulses for producing an enabling signal that enables said sequence circuit to respond to said second and third telephone call dial pulses within a first predetermined time; and
    a second timing circuit responsive to operation of said sequence circuit for operating the device for a second predetermined period of time whereafter the second timing circuit reverts to an initial setting.

2. A system as defined in claim 1 wherein the means for generating a transfer signal includes:
    a pair of gating circuits each having an output and a pair of inputs;
    a two step stepping circuit having a pair of outputs respectively connected to first inputs of said gating circuit;

means for operating said stepping circuit to apply an enabling condition to a first input of a first gating circuit during receipt of the second call dial pulse and, then to apply an enabling condition to a first input of the second gating circuit during receipt of the third call dial pulse; and means responsive to the second and third call pulses for applying successively operating pulses on the second input of the first gating circuit and then on second input of the second gating circuit whereupon the transitions in gate outputs occurring at the terminations of second and third call dial pulses act as transfer signals.

3. A system as defined in claim 2 wherein said telephone call dial pulses are multifrequency signals, and the system includes:

means for converting each multifrequency signals to a binary coded digital signal; and means responsive to each conversion of a multifrequency signal for applying said operating pulses to both said second inputs of said gating circuits to produce the succession of transfer signal outputs.

4. A system as defined in claim 1 wherein the sequence circuit includes:

a pair of stages, each having an enabling input, a signal input, a transfer input and an output:

means rendered effective upon operation of said first timing circuit for applying signals to both said enabling inputs;

means responsive to the second and third call dial pulses for converting said dial pulses to input signals and successively applying said input signals to the signal inputs to the individual stages; and means applying said transfer signals to successive transfer inputs to successively operate the stages of said sequence circuits to transfer said input signals to the respective outputs to operate said second timing circuit to release the locked device.

5. A system for selectively operating a locked device by telephone multifrequency dial pulses received over a telephone line, which comprises:

a pair of bistable latching devices, each having an enabling input, a signal input, an operate input and an output;

means responsive to a first telephone dial pulse for applying an enabling signal to the enabling inputs of both said latching devices;

means responsive to a second distinctive call dial pulse for applying a signal condition on the signal input of a first of said latching devices;

means responsive to a third distinctive call dial pulse for applying a signal condition on the signal input of the second of said latching devices;

means responsive to the termination of the second dial pulse for applying a signal to operate the first latching device to transfer the signal condition on the signal input to the output of the first latching device;

means responsive to the termination of the third dial pulse for applying a signal to operate the second latching device to transfer the signal condition on the signal input to the output of the second latching device;

means responsive to the transfer of the signal conditions on the respective latching devices to the outputs thereof for releasing said locked device.

6. A system for selectively releasing a locked device in response to a sequence of three predetermined telephone dial number signals received over a telephone line, which comprises:

a sequence circuit of two stages, each stage of which includes three inputs and a single output operated upon receipts of signals on all three inputs; the third input to each stage being operative upon receipt of a signal input transition to transfer the input on the second input to the output;

means responsive to the receipt of a first of said dial number signals over the telephone line for applying first signals to first inputs of both said stages;

means responsive to the successive receipt of the second and third of said dial number signals over the telephone line for successively applying second signals to second line for successively applying second signals to second inputs of said stages;

a pair of gating circuits connected respectively to third inputs of said stages;

a bistable switching circuit having a normal output connected to condition a first of said gating circuits for operation and complementary output connected to condition a second of said gating circuits for operation;

means for normally setting said bistable circuit to condition the first of said gating circuits;

means responsive to the receipt of each dial number for applying a gate operate signal to both said gating circuits to operate the conditioned gating circuit;

means responsive to the termination to the second dial number signal for impressing a transition signal from said operated first gating circuit to operate said first stage of said sequence circuit to transfer the signal on the second input of the first stage of said sequence circuit to the output thereof;

means responsive to the termination of the second dial number signal for operating said bistable circuit to condition the second of said gating circuits to operate in response to the next gate operate signal;

means responsive to the termination of the third call number signal for impressing a transition signal from said operated second gating circuit to operate said second stage of said sequence circuit to transfer the signal on the second input of the second stage of said sequence circuit to the output thereof;

means responsive to the transferred signals on the outputs of said sequence circuit for releasing the locked device.

7. A system as defined in claim 6, wherein the means for applying first signals to the sequence circuit includes a timing circuit having a predetermined period of operation and which is effective to preclude the operation of the sequence circuit if the second and third dial number signals are not received with said predetermined period of operation.

8. A system as defined in claim 6 wherein the means for releasing the locked device includes a timing circuit for limiting the time that the sequence circuit is effective to release the locked device.

9. A system for selectively releasing a locked device in response to three predetermined dial multifrequency signals received over a telephone line, which comprises:

means for converting each dial multifrequency signal into a binary coded digital signal and for generating a logic 1 ready signal during the recognition of each dial signal;

a two stage step stepping circuit having a first stage and a second stage, said second stage having a normal logic 0 output and a complementary logic 1 output;

a pair of "AND" gating circuits having first inputs connected to respond to each logic 1 ready signal and second inputs respectively connected to said normal and complementary outputs of said second stage of the stepping circuit to alternately produce logic 1 outputs;

a two stage sequence circuit, each stage of which is adapted to respond to the receipt of three sequential inputs to produce an output signal;

means operated by the converting means in response to the first of said predetermined dial signals for applying a first input to both said sequence circuits for a limited period of time;

means operated by the converting means in response to the second of said predetermined dial signals for applying a second input to the first stage of said sequence circuit;

means responsive to the termination of said second dial pulse for stepping said two stage stepping circuit to operate the second stage to reverse the logic outputs so that the second gating circuit is conditioned to respond to the third ready signal to produce a logic 1 output;

means for applying the transition of the logic 1 output of the first gating circuit in response to the termination of the second ready signal as a third input to operate said first stage of said sequence circuit;

means operated by the converting means in response to a third of said predetermined dial signals for applying a second input to the second stage of said sequence circuit;

means for applying the transition of the logic 1 output of the second gating circuit in response to the termination of the third ready signal as a third input to operate said second stage of said sequence circuit; and means responsive to operation of both stages of said sequence circuit for releasing the locked device.

10. A system for selectively operating lock devices at a plurality of remote locations by signals transmitted through a telephone central switching office, which includes:

a central controller telephone set for generating a control dial signal plus two call number signals indicative of each of the respective remote locations; and a telephone set at each remote location having a repertoire dialer for automatically dialing the controller's telephone set and establishing a communication channel between a remote telephone set initiating a call and the controller's telephone set;

each of the remote locations having:

a pair of gating circuits with a pair of inputs and an output;

a two step stepping circuit for successively applying first inputs to said gating circuits;

a sequence circuit having two stages connected individually to said gating circuits and a first stage of which is conditioned for operation in response to the receipt of a first of the call number signals and a second stage of which is conditioned for operation in response to the receipt of a second of the call number signals;

means responsive to receipt of each call number signal for successively operating said gating circuits for applying signals to successively operate said conditioned stages of said sequence circuit to produce a pair of outputs; and means responsive to said pair of outputs from said sequence circuits to operate the lock device at the remote location initiating the call.

11. A system for selectively controlling the operation of a device at a location remote from a controller location by means of signals transmitted from the controller location through a telephone central office to a remote location, which comprises:

a telephone set at the remote location having the capability of generating the telephone call number of the controller location;

a telephone set at the controller location having regular number pushbuttons for generating dial call number signals and a special pushbutton for generating a special dial control signal; and means responsive to successive receipt of the special control signal followed by receipt of two call number signals indicative of the remote location for operating the device at the remote location wherein said means comprises:

a sequence circuit having a pair of stages, each stage having a call signal input, an output, and means responsive to a transition in an applied signal for transferring a signal at the input to the output;

a pair of gating circuits, each of which includes first and second inputs;

means responsive to the receipt of the control signal and the two call number signals for applying inputs to the first inputs of both said gating circuits;

means responsive to the first and second call number signals for successively operating said gating circuits for successively applying signals to the transfer means of the respective stages of the sequence circuit;

means responsive to the first of said call number signals for impressing a signal to the input of the first stage of said sequence circuit which signal is transferred to the output thereof upon termination of the signal applied to the transfer means from said first gating circuit;

means responsive to the second of said call number signals for impressing a signal to the input of the second stage of said sequence circuit which signal is transferred to the output thereof upon termination of the signal applied to the transfer means from said second gating circuit; and means responsive to outputs from both said stages of said sequence circuits for operating the device at the remote location.

12. A system as defined in claim 11, which includes:
a timing circuit responsive to the dial control signal for applying signals to enable the sequence circuit to respond to the first and second call number signals for only a predetermined period of time.

13. A system as defined in claim 11, which includes:
a timing circuit operated by said pair of outputs from said sequence circuit for controlling the period of operation of said lock device operating means.

14. A system for selectively operating lock devices at a plurality of remote locations by signals transmitted through a central telephone switching office which includes:
- a central controller telephone set for generating a control signal followed by discrete two number sequences of signals, each of said discrete signals being indicative of and designating a remote location;
- a telephone set at each remote location; and
- a repertoire dialer at each remote location for automatically dialing the controller telephone and establishing a communication channel between an initiating telephone set and the controller telephone set;

each of said locations also including:
- a pair of gating circuits, each gating circuit having a pair of inputs;
- a two step stepping circuit having a pair of outputs for initially conditioning a first input to a first of said gating circuits, and subsequentally conditioning a second input to a first input of a second of said gating circuits;
- a pair of sequence circuits each having a conditioning input, an operating input, and an output;
- means responsive to the receipt of a discrete two number sequence of signals indicative of the remote location initiating a call for successively applying conditioning signals to the conditioning inputs of said pair of sequence circuits;
- means responsive to the receipt of said discrete two number signals for applying inputs to the second inputs of the first and second gating circuits;
- means responsive to the termination of the first discrete number signal for operating said stepping circuit to switch the conditioning input from the first input of the first gating circuit to the first input of the second gating circuit and for effecting a transition in operation of the first gating circuit;
- means for applying the transition in operation of the first gating circuit to the operating input of the first sequence circuit to transfer the input signal to the output thereof;
- means responsive to the termination of the second discrete number signal for effecting a transition in operation of said second gating circuit;
- means for applying the transition in operation of the second gating circuit to the operating input of the second sequence circuit to transfer the input signal to the output thereof; and
- means operated by outputs from both said sequence circuits for operating the lock device at that particular location.

15. A system for selectively operating one of a plurality of devices at diverse locations by the transmission of distinct sequences of multifrequency telephone dial signals through a telephone central switching office to the selected location, where each of the locations comprises:
- means for converting each multifrequency signal into a binary coded digital signal and for generating a ready signal upon conversion of each binary coded digital signal;
- a sequence circuit including a pair of J-K flip-flops having clear and J inputs and a Q output together with a clock input for transferring the J input to the Q output;
- a pair of gates each having a pair of inputs and a single output, each output respectively connected to the clock inputs of the J-K flip-flops, each of said gates having an input connected to receive each ready signal;
- a two stage stepping circuit for successively applying enabling conditions to the second inputs of said pair of gates;
- a first timing circuit means operative in response to a first binary coded digital signal for enabling the first stage of said two step circuit and for applying clear pulses to the clear inputs of said pair of J-K flip-flops;
- means responsive to the second of said binary coded digital signals for applying an output signal to said J-input of a first of said J-K flip-flops;
- means responsive to the termination of the second ready signal for operating said enabled first stage to step the enabling condition from the second input of the first gate to the second input of the second gate; and for impressing a change in output of the first gate to operate said first J-K flip-flop to transfer the J-input thereof to the Q output;
- means responsive to the third of said binary coded digital signals for applying an output signal to said J-input of a second of said J-K flip-flops;
- means responsive to the termination of the third ready signal for impressing the change in output of the second gate for operating said second J-K flip-flop to transfer the J-input thereof to the Q output;
- means responsive to outputs from both said Q outputs of said J-K flip-flops for operating said device at the selected location.

16. A system for selectively releasing locking devices at a plurality of remote locations, which comprises:
- means for establishing voice communication paths from telephones at each of the remote locations over communication lines through a telephone central office to a telephone set at a controller location, said controller telephone set including pushbutton means for generating multifrequency signals indicative of numbers and a special pushbutton means for generating a special multifrequency signal;

each of said remote locations having thereat:
- lock control means for the locking device;
- means connected to the communication line running to each location for converting said multifrequency signals into binary coded digital signals;
- a one-shot multivibrator having two outputs and a first predetermined period of operation;
- means responding to a binary coded digital signal representative of the receipt of said special multifrequency signal for operating said one-shot multivibrator;
- means for disconnecting the telephone at a remote location;
- means responsive to a first output of said one-shot multivibrator for operating said disconnecting means for said first predetermined time;
- a pair of J-K flip-flops having clock, clear and J inputs and a Q output;
- means for applying said first output of said one shot multivibrator to said clear inputs of said pair of flip-flops;
- means responsive to binary coded digital signals representative of two multifrequency number signals indicative of a particular location for successively generating pulses and successively applying these pulses to the J inputs of said flip-flops;

means responsive to the successive reception of the two multifrequency signals representation of the particular location for generating successive clock pulses and applying these clock pulses to clock inputs to operate the two flip-flops; and means connected to and operated by the Q outputs of the two flip-flops for operating the lock control at the particular location.

* * * * *